United States Patent [19]

Sandberg

[11] 4,128,164
[45] Dec. 5, 1978

[54] CONSTANT-TENSION CONVEYOR DRIVE FOR THERMAL PROCESSING APPARATUS

[75] Inventor: Glenn A. Sandberg, Lockport, Ill.

[73] Assignee: Formax, Inc., Mokena, Ill.

[21] Appl. No.: 847,719

[22] Filed: Nov. 2, 1977

[51] Int. Cl.² .............................................. B65G 23/44
[52] U.S. Cl. ...................................... 198/813; 62/380; 198/835; 198/952
[58] Field of Search ................... 198/813, 835, 952; 62/374, 380; 432/239; 34/118; 214/21; 226/25, 37, 195

[56] References Cited

U.S. PATENT DOCUMENTS

| 2,413,339 | 12/1946 | Stadelman | 198/835 |
| 3,757,533 | 9/1973 | Kent | 62/380 |
| 3,765,525 | 10/1973 | Hartwig | 198/813 |

Primary Examiner—Evon C. Blunk
Assistant Examiner—Jeffrey V. Nase
Attorney, Agent, or Firm—Kinser, Plyer, Dorn & McEachran

[57] ABSTRACT

A self-compensating constant-tension drive system for a belt conveyor used in a cryogenic freezing tunnel or other elongated thermal processing apparatus, comprising a hydraulic motor driving the drive pulley of the conveyor, a hydraulic pump driven by the tensioning pulley, and a pressure relief valve connected to the outlet of the pump to inhibit flow from the pump and thus inhibit rotation of the pump and tensioning pulley until a predetermined tension is established in the upper run of the belt; the belt is longer than the inter-pulley spacing to allow for substantial thermal expansion and contraction, and the excess belt length is stored in a catenary sag adjacent the drive pulley.

7 Claims, 2 Drawing Figures

U.S. Patent Dec. 5, 1978 4,128,164
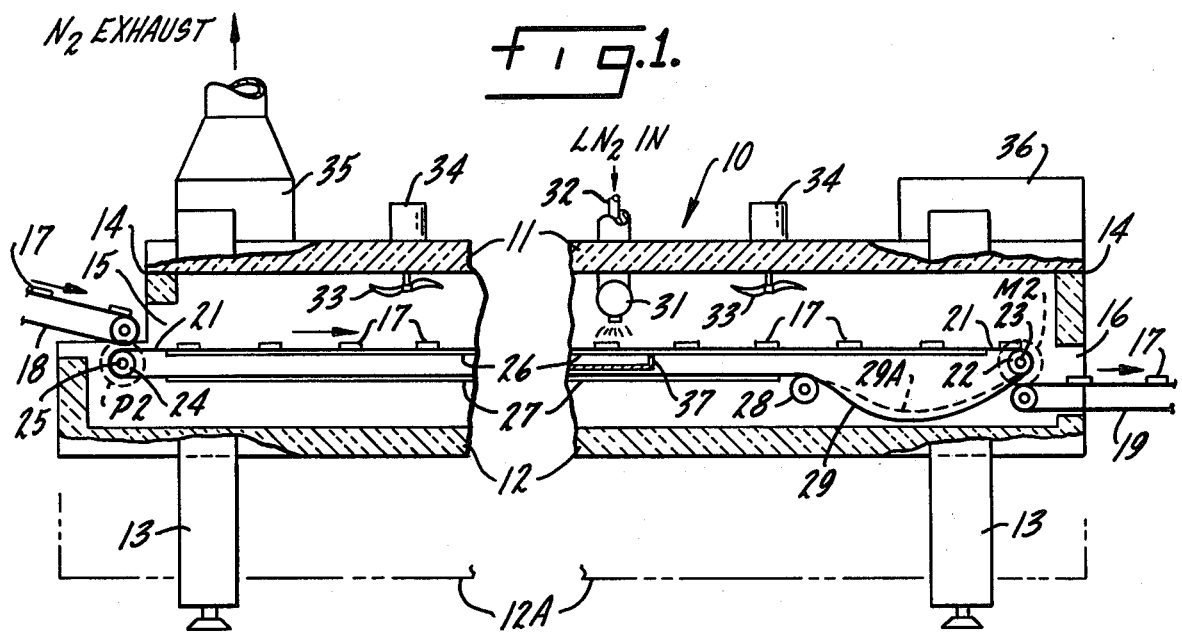
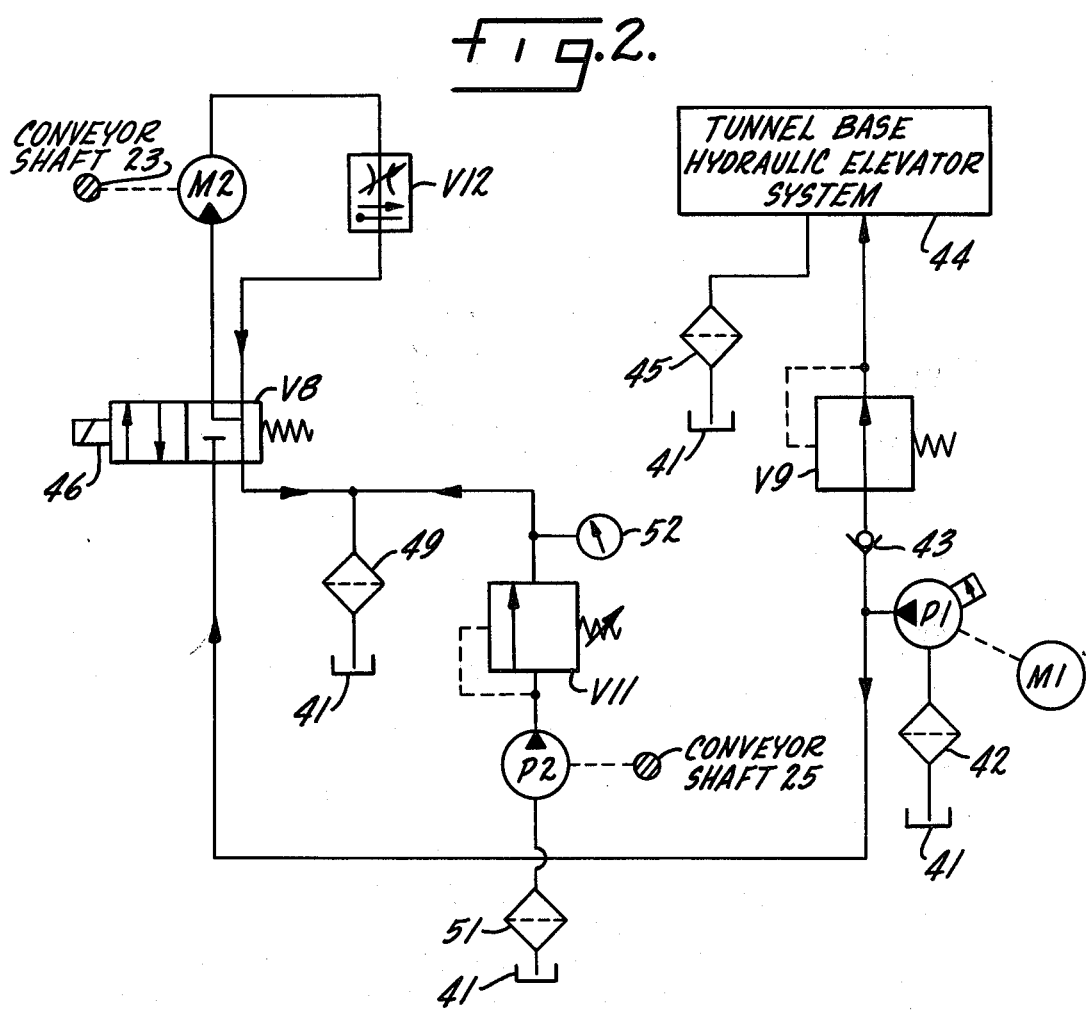

CONSTANT-TENSION CONVEYOR DRIVE FOR THERMAL PROCESSING APPARATUS

BACKGROUND OF THE INVENTION

In high-volume installations for the manufacture of frozen food products, the freezing apparatus frequently comprises a long insulated chamber, called a tunnel, through which the product passes on an endless belt conveyor. Near the outlet end of the tunnel, the food product is sprayed with a cryogen, frequently liquified nitrogen, as the final freezing step for the product. Cryogen gas, vaporized by contact with the food product and the conveyor, is directed back through the tunnel in a direction counter to the flow of the food product, progressively chilling the product as it moves through the tunnel chamber. Consequently, the conveyor belt moves continuously through zones of rapidly changing temperature, from somewhat below ambient at the entrance end of the tunnel down to temperatures as low as −320° F. in the region subject to liquified cryogen spray, and back to a much higher temperature, though still very cold, at the outlet end of the tunnel.

The conveyor belt is also subject to other thermal stresses, as when the freezing tunnel is shut down for cleaning or servicing so that the belt returns to ambient temperature. Similar widely varying thermal conditions may be encountered with conveyor belts used in other thermal processing apparatus, such as heat treating tunnels or the like.

In the operation of any high speed belt conveyor system, particularly a system that is of substantial length (in a typical cryogenic freezing tunnel the conveyor length may be of the order of 60 to 80 feet) it is highly desirable to maintain a constant tension on the product-supporting run of the belt. Conventional spring tensioning devices are frequently unsatisfactory, in thermal processing equipment, due to the effect of temperature extremes on the tensioning apparatus itself. Thus, in a cryogenic freezing tunnel using conveyor tensioning springs mounted within the tunnel, the extreme low temperatures may lead to embrittlement and premature failure of the springs by thermal aging. On the other hand, if a spring tensioning arrangement is mounted outside the tunnel, it becomes difficult to maintain an adequate thermal seal. Furthermore, for long conveyor belts in a wide variety of applications, spring tensioning arrangements of adequate capacity are difficult to construct and to adjust for optimum operation of the conveyor system.

Ideally, the drive for a long belt type conveyor used in a thermal processing apparatus should provide a constant tension on the belt that automatically and inherently is adjusted to compensate for changes in the belt length due to changing thermal conditions. Moreover, the constant-tension portion of the conveyor drive should also compensate for other changes in operation of the belt conveyor, such as major variations in the operating speed of the belt or in the quantity of material supported by the belt at any given time. Compensated tension systems of this kind, to the extent known in the art, have generally not been satisfactory when applied to cryogenic freezing tunnels or other thermal processing apparatus of the kind that is normally operated within a temperature range greatly different from ambient temperature.

SUMMARY OF THE INVENTION

It is a principal object of the present invention, therefore, to provide a new and improved constant-tension conveyor drive system for a belt conveyor employed in a thermal processing apparatus of the kind comprising an elongated insulated chamber normally maintained within a temperature range greatly different from ambient temperature.

Another object of the invention is to provide a new and improved constant-tension conveyor drive system for a long endless conveyor belt, extending through a thermal processing apparatus, which is inherently self-compensating for thermal changes, belt speed changes, and loading changes.

A specific object of the invention is to utilize a conveyor belt, in a thermal processing apparatus, that is longer than required to span the length of the apparatus, and to store the excess length of conveyor belt in a region immediately adjacent the drive pulley for the belt, the best position for immediate compensation for changes affecting the belt tension.

Accordingly, the invention is directed to a self-compensating, constant-tension conveyor drive system for a thermal processing apparatus of the kind comprising an elongated, insulated chamber which is normally maintained within a temperature range greatly different from ambient, a drive pulley at one end of the chamber, a tensioning pulley at the other end of the chamber, and an endless conveyor belt extending longitudinally of the chamber around both pulleys, the belt being appreciably longer than the spacing between the two pulleys to allow for substantial thermal expansion and contraction of the belt. The conveyor drive system comprises a main fluid pump, independently driven, a fluid motor having an inlet port connected to the main pump, an outlet port, and a drive shaft connected in driving relation to the conveyor drive pulley, and a rotary tension control pump driven from the tensioning pulley. A pressure-actuated flow control device is connected to the outlet of the tension control pump to inhibit rotation of the tension control pump and the tensioning pulley by inhibiting output flow from the tension control pump until a predetermined tension is established in one run of the conveyor belt.

BRIEF DESCRIPTION OF THE DRAWINGS

FIG. 1 is a simplified and greatly shortened elevation view, partly schematic, of a cryogenic freezing tunnel constituting one form of thermal processing apparatus to which the present invention may be applied, with the side of the tunnel cut away to show the conveyor system in the tunnel; and FIG. 2 is a schematic illustration of the hydraulic conveyor drive system of the invention.

DESCRIPTION OF THE PREFERRED EMBODIMENT

FIG. 1 illustrates a thermal processing apparatus 10, in this instance a cryogenic freezing tunnel for fast freezing of food products. Freezing tunnel 10 includes an elongated, insulated chamber comprising a top 11 supported upon a series of legs 13. A base 12, which is U-shaped in cross-sectional configuration, is also supported upon the legs 13 and is sealed against the top 11 by suitable means such as a gasket 14. Each of the legs 13 includes a hydraulic elevator mechanism (not shown) to maintain the base 12 in the elevated closed position shown in FIG. 1 and which may also be utilized to lower the base to the position 12A for periodic cleaning or for servicing of the interior of the tunnel chamber.

At the left-hand end of tunnel 10, as seen in FIG. 1, there is a product entrance opening 15 in base 12; at the other end of the tunnel there is an exit opening 16. Food product 17, which may comprise hamburger patties, steaks, chicken pieces or patties, or any other of a wide variety of food products, enters tunnel 10 through entrance opening 15 on an input conveyor 18 that discharges onto a tunnel conveyor belt 21. The food product 17 is discharged, after passing through tunnel 10, onto a take-away conveyor 19.

The endless conveyor belt 21 extends throughout the length of freezing tunnel 10. At the exit end of the tunnel, adjacent exit opening 16, belt 21 engages a drive pulley 22 mounted on a transverse conveyor drive shaft 23. At the opposite end of the tunnel, adjacent entrance opening 15, belt 21 engages a tensioning pulley 24 mounted upon a shaft 25. Belt 21 is usually a metal belt of open mesh construction. The upper run of belt 21, which carries the food product 17 through tunnel 10, is supported throughout its length by suitable means such as the side support rails 26. Throughout most of its length, the lower run of belt 21 is similarly supported by rails 27. However, a length 29 of the conveyor belt adjacent drive pulley 22 is left unsupported; the inner end of this portion 29 of belt 21 is brought back into alignment with support rails 27 by an idler pulley 28.

A spray header 31 is supported from the top 11 of tunnel 10, extending across the freezing chamber a short distance from the exit opening 16 of the tunnel. Header 31 is connected to an insulated input conduit 32 that is in turn connected to a source of liquified nitrogen or other cryogen (not shown). A series of fans 33 are mounted in the tunnel top 11, throughout the length of the tunnel, powered by motors 34 mounted on the tunnel top 11. An exhaust plenum 35 communicates with the entrance end of tunnel 10, through top 11. Suitable controls for the tunnel are mounted in an enclosure 36 shown located at the exit end of the tunnel.

It will be recognized that, except for the unsupported section 29 of the conveyor belt 21, freezing tunnel 10 as thus far described is generally conventional. Of course, the tunnel has been greatly foreshortened in FIG. 1. In a typical fast-freezing installation for food products, the freezing chamber of tunnel 10 may have an overall length of the order of 60 to 80 feet or more. Furthermore, the number of fans 33 between the exhaust plenum 35 and header 31 is much greater than suggested by the drawing. In a typical 65 foot tunnel, there might be as many as fifteen fans 33 in this portion of tunnel 10.

Because tunnel 10 is generally conventional, only a brief description of the basic tunnel operation is required. As the food product 17 passes beneath header 31, it is sprayed with a liquid cryogen, in this instance liquified nitrogen. Most of the liquified nitrogen flashes to gas as soon as it makes contact with food product 17 or conveyor belt 21. A collection pan 37 may be provided to collect any excess liquid nitrogen, allowing it to be recycled. Most of the cold nitrogen vapor is drawn through the freezing chamber toward plenum 35 by an exhaust fan (not shown) connected with the plenum. As the cold gas moves toward the exhaust plenum, it is continuously re-directed back into contact with the food product 17 by the fans 33. The portion of the tunnel 10 to the right of header 31, as seen in FIG. 1, serves as a thermal equilibration section. Here, the fans 33 direct the nitrogen vapor into contact with the food product 17 to aid head removal from its interior areas before the food product is discharged from conveyor 21 onto take-away conveyor 19.

The basic construction illustrated for tunnel 10 is described in greater detail, particularly with respect to the basic configuration for an elevator-mounted tunnel base, in Kent U.S. Pat. No. 3,757,533. A preferred tunnel construction utilizing the same principles is described in greater detail in the copending application of M. W. Morgan et al. Ser. No. 847,721, filed Nov. 2, 1977. However, it should be understood that the self-compensating constant-tension conveyor drive system of the present invention, as described below, can be applied with equal effectiveness to freezing tunnels of very different construction and also to other forms of thermal processing apparatus which require an elongated continuous belt conveyor.

Belt 21 experiences great thermal changes in the operation of freezing tunnel 10. Thus, at any given time the extreme left-hand end of belt 21, particularly the portion exposed to entrance opening 15, is at a much higher temperature than the portion of the belt currently traversing the space below the cryogen spray head 31. In this regard, it should be noted that the temperature of the liquified nitrogen impinging upon the belt immediately below header 31 may be of the order of $-320°$ F. Similarly, the right-hand end of the belt is again at a substantially higher temperature due to exposure of the belt, to at least a limited extent, to the exit opening 16. That is, the moving belt is continuously exposed to an extreme temperature gradient ranging downwardly from entrance opening 15 to the location of header 31 and sharply rising again toward exit opening 16.

Apart from normal, continuous operation of freezing tunnel 10, belt 21 is also subject to other major thermal stresses. Thus, tunnel 10 must be shut down periodically for cleaning and servicing of the equipment in the freezing chamber. When this is done the entire belt is brought up to ambient temperature and must subsequently be greatly reduced in temperature when the tunnel is placed in operation at a later time. The substantial contraction of belt 21 that occurs as the tunnel resumes operation does not all take place instantaneously; there is always some inertia in the thermal expansion and contraction process. Consequently, it is quite difficult to maintain constant tension on the upper run of conveyor belt 21, as is required for the most efficient and effective operation of the conveyor and tunnel 10. The conveyor drive system of the present invention is intended to and does provide for constant tension, within very close tolerances, for all phases of operation of tunnel 10.

FIG. 2 provides a schematic illustration of the constant-tension conveyor drive system of the present invention. This drive system comprises a main hydraulic pump P1 having its inlet connected to a reservoir 41 through a strainer 42. Pump P1 is independently driven by an electric motor M1. The pump may be utilized to operate a hydraulic elevator system 44 for the base 12 of tunnel 10, through a circuit comprising a check valve 43 and a pressure reducing valve V9. The return from the hydraulic elevator system 44 includes a filter 45.

The conveyor drive, in FIG. 2, comprises an output connection from pump P1 through a valve V8, actuated by a solenoid 46, to a hydraulic drive motor M2 connected to the shaft 23 on which the conveyor drive pulley 22 is mounted (FIG. 1). The return line from hydraulic motor M2 includes an adjustable flow control valve V12, valve V8, and a filter 49 that is returned to reservoir 41.

As shown in FIG. 1, a second hydraulic pump P2 is mounted upon and driven by the shaft 25 of the tensioning pulley 24 of the conveyor system. Referring to FIG. 2, it is seen that pump P2 has an inlet connection to the hydraulic reservoir 41 through a filter 51. The output of pump P2 is connected to an adjustable pressure relief valve V11 that is returned to the reservoir through filter 49. A gauge 52 may be provided on the outlet side of the pressure relief valve V11.

When the conveyor drive system is placed in operation, the main hydraulic pump P1 is powered from electric motor M1. Solenoid 46 is energized to actuate valve V8 to its operating condition in which fluid under pressure from pump P1 is supplied to the inlet of hydraulic motor M2. Motor M2 drives conveyor shaft 23 to rotate the conveyor drive pulley 22 and start the conveyor in operation. Valve V12 can be adjusted to regulate the flow through motor M2 and thereby adjust the speed of conveyor belt 21.

When the conveyor system first starts in operation, with motor M2 turning drive pulley 22, the resulting tension in the upper run of belt 21 tends to rotate tensioning pulley 24 and its shaft 25. Initially, however, shaft 25 cannot rotate to any appreciable extent because tensioning pump P2 has its outlet blocked by valve V11. This condition is maintained until sufficient tension is built up in the upper run of conveyor belt 21 to overcome the resistance effectively afforded by relief valve V11 and to permit an appreciable output from tensioning pump P2. Thus, conveyor belt 21 actually begins movement, apart from preliminary tensioning, only when a predetermined tension has been established in the belt. Furthermore, that tension remains constant, at the level required to maintain pump P2 in operation, as long as tunnel 10 functions. The level of the constant tension maintained on the upper run of conveyor belt 21 is established by adjustment of valve V11.

The extreme temperature differentials to which conveyor belt 21 is subject, particularly the change from ambient to operating temperatures for the belt, cause appreciable changes in the length of the belt. Consequently, belt 21 must be longer than the belt length that would be necessary to span the distance between pulleys 22 and 24. The excess belt length is stored in the catenary sag portion 29 in the lower run of belt 21, immediately following drive pulley 22. The configuration of the storage sag 29 for maximum temperature, at the time of initial start-up for tunnel 10, is shown in solid lines in FIG. 1. For the coldest condition, the position of the sag is generally indicated by dash line 29A.

Belt 21 should always be operated under some tension, even in the lower return run, customarily referred to as the "untensioned" run. For this reason, the catenary sag storage portion 29 should be located immediately following drive pulley 22 so that the major portion of the lower run of belt 21 is under limited tension between idler pulleys 28 and tensioning pulley 24.

The self-compensating constant-tension conveyor drive system of the present invention, as described above, is highly advantageous in operation. The use of hydraulic motor M2 and flow control valve V12 as the basic conveyor drive components provides an infinitely variable belt speed over a broad range and with constant torque. Typically, for a freezer tunnel of 60 to 80 foot length, the belt speed may be adjusted, using valve V12, over a range from zero to 60 feet per minute. This provides convenient and virtually instantaneous changeover for tunnel 10 to meet varying requirements of the input equipment, represented in FIG. 1 by input conveyor 18.

The tensioning portion of the system, comprising the tension control pump P2 and valve V11, affords a constant and adjustable tension for conveyor belt 21, applying substantial tension to only the upper run of the belt. This reduces belt wear and effectively eliminates changes in belt length, in the top run of the belt, due to thermal changes. Any jerky (stick and slip) belt motion is eliminated. Furthermore, changes in total belt length are fully accommodated by the catenary sag storage portion 29.

I claim:

1. A self-compensating, constant-tension conveyor drive system for a thermal processing apparatus of the kind comprising an elongated, insulated chamber which is normally maintained within a temperature range greatly different from ambient, a drive pulley at one end of the chamber, a tensioning pulley at the other end of the chamber, and an endless conveyor belt extending longitudinally of the chamber around both pulleys, the belt being appreciably longer than the spacing between the two pulleys to allow for substantial thermal expansion and contraction of the belt, the conveyor drive system comprising:
   a main fluid pump, independently driven;
   a fluid motor having an inlet port connected to the main pump, an outlet port, and a drive shaft connected in driving relation to the conveyor drive pulley;
   a rotary tension control pump driven from the tensioning pulley;
   and a pressure-actuated flow control device connected to the outlet of the tension control pump to inhibit rotation of the tension control pump and the tensioning pulley by inhibiting output flow from the tension control pump until a predetermined tension is established in one run of the conveyor belt.

2. A constant-tension conveyor drive system for a thermal processing apparatus, according to claim 1, in which the conveyor drive system further comprises support means for supporting most of the length of the untensioned run of the conveyor belt, confining the storage of the excess conveyor belt length to a limited unsupported portion of the untensioned run of the belt.

3. A constant-tension conveyor drive system for a thermal processing apparatus, according to claim 2, in which the support means extends from the tensioning pulley toward the drive pulley but terminates at an apreciable distance from the drive pulley, the storage portion of the untensioned run of the conveyor belt being located between the end of the support means and the drive pulley.

4. A constant-tension conveyor drive system for a thermal processing apparatus, according to claim 3, in which the support means includes an idler pulley located at the end of the support means nearest the drive pulley.

5. A constant-tension conveyor drive system for a thermal processing apparatus, according to claim 1, in which the flow control device is an adjustable pressure relief valve, permitting adjustment of the tension on the conveyor belt.

6. A constant-tension conveyor drive system for a thermal processing apparatus, according to claim 1, in which the main pump, the motor, and the tension control pump are all hydraulic devices working from a common reservoir of hydraulic fluid.

7. A constant-tension conveyor drive system for a thermal processing apparatus, according to claim 6, and further comprising a variable flow control valve connected to the motor to provide continuously variable conveyor speed over a substantial speed range.

* * * * *